United States Patent
Blattner et al.

(10) Patent No.: US 6,564,468 B2
(45) Date of Patent: May 20, 2003

(54) PROCESS FOR PRODUCING AN ARRANGEMENT FOR DETERMINING THE RELATIVE POSITION OF TWO BODIES THAT ARE MOVABLE IN RELATION TO EACH OTHER

(75) Inventors: Peter Blattner, Dingolshausen (DE); Bruno Schnös, Knetzgau (DE); Herbert Kirchner, Schweinfurt (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 10/146,009

(22) Filed: May 15, 2002

(65) Prior Publication Data

US 2002/0129508 A1 Sep. 19, 2002

Related U.S. Application Data

(62) Division of application No. 09/569,707, filed on May 12, 2000, now abandoned.

(51) Int. Cl.[7] .................................................. G01B 7/00
(52) U.S. Cl. ............................. 33/706; 33/705; 228/178
(58) Field of Search ........................ 33/706, 707, 708, 33/710, 703, 705; 228/178, 182; 219/121.64, 121.76

(56) References Cited

U.S. PATENT DOCUMENTS

| | | | |
|---|---|---|---|
| 3,816,002 A | | 6/1974 | Wieg ............................. 35/169 |
| 4,198,757 A | * | 4/1980 | Nelle et al. .................... 33/704 |
| 4,462,159 A | | 7/1984 | Nelle ......................... 33/125 C |
| 4,541,181 A | | 9/1985 | Giacomello .................. 33/125 |
| 4,554,741 A | | 11/1985 | Affa .......................... 33/125 C |
| 4,584,773 A | | 4/1986 | Rieder et al. .............. 33/125 C |
| 4,785,149 A | * | 11/1988 | Gilliland .................. 219/130.1 |
| 5,611,148 A | * | 3/1997 | Affa .............................. 33/702 |
| 5,842,283 A | * | 12/1998 | Yatsu et al. .................... 33/484 |
| 5,987,768 A | * | 11/1999 | Freitag et al. ................ 33/702 |
| 6,092,296 A | * | 7/2000 | Nelle ........................... 33/700 |

FOREIGN PATENT DOCUMENTS

| | | |
|---|---|---|
| DE | 3245914 | 3/1984 |
| DE | 3316082 | 11/1984 |
| DE | 245482 | 5/1987 |
| DE | 269439 | 6/1989 |
| DE | 294558 | 10/1991 |
| DE | 297233 | 1/1992 |
| DE | 297234 | 1/1992 |
| DE | 297261 | 1/1992 |
| DE | 4309863 | 6/1994 |
| DE | 4318017 | 11/1998 |
| EP | 0624780 | 11/1994 |
| FR | 2746498 | 9/1997 |
| WO | 9202781 | 2/1992 |
| WO | 9204599 | 3/1992 |

OTHER PUBLICATIONS

S. Uemura. "Sony Magnescale," Japan Electronic Engineering, No. 36, Nov. 1969, pp. 20–23.

\* cited by examiner

Primary Examiner—Diego Gutierrez
Assistant Examiner—Yaritza Guadalupe

(57) ABSTRACT

In an arrangement for determining the relative position of two bodies (3, 7) that are movable relative to each other, a separate measuring tape (29) is attached to a first (3) of the two bodies (3, 7). The measuring tape includes at least one track of measuring markings, distributed in the longitudinal direction of the tape. The second (7) of the two bodies (3, 7) carries a sensor arrangement (31) which responds to the measuring markings and travels along the track, in the course of relative movement between the two bodies (3, 7). The measuring tape (29) is attached to the first body (3), at at least two attachment points that are arranged at a distance from each other in the longitudinal direction of the tape, and is elastically stretched between the attachment points in the longitudinal direction of the tape.

3 Claims, 7 Drawing Sheets

PROCESS FOR PRODUCING AN ARRANGEMENT FOR DETERMINING THE RELATIVE POSITION OF TWO BODIES THAT ARE MOVABLE IN RELATION TO EACH OTHER

CROSS REFERENCE TO RELATED APPLICATION(S)

This application is a divisional of U.S. patent application Ser. No. 09/569,707, filed May 12, 2000, now abandoned, which claims priority to German Application No. 199 22 363.7, filed May 14, 1999.

BACKGROUND

The invention concerns, in a first aspect, an arrangement for determining the relative position of two bodies which are movable in relation to each other. On a first body of the two, a separate measuring tape is arranged which features at least one track of measuring markings, distributed along the length of the tape. The second of the two bodies carries a sensor arrangement which responds to the measuring markings and which, in the course of relative movement between the two bodies, travels along the track.

In general, one seeks to keep the measuring tape free of folds or distortions so that the accuracy of measurement is not impaired by unevennesses of the measuring tape, and so that, if the second body brushes closely over the measuring tape, the second body's motions are not hindered by undulations in the measuring tape. Occasionally, the position-determining arrangement is used in a working environment which is subject to relatively strong variations in temperature. Such variations in temperature may occur simultaneously over the entire position-determining arrangement, or may only occur locally on individual points of the position-determining arrangement. Differences in the heat-transfer conditions and/or differences in thermal-expansion conditions between the first body and the measuring tape can cause, if the temperature of the working environment drops, the first body to contract more quickly and/or more strongly as a function of temperature than the measuring tape. This may occur, say, if the first body is made of a highly heat-conducting metal, while the measuring tape consists of a material which is thermally significantly less conductive. The consequence of such a drop in temperature could cause a distortion in the measuring tape, if the latter cannot accompany the thermal contraction of the first body fast enough.

SUMMARY

Consequently, it is an object of the invention in its first aspect to provide a way that makes it possible to avoid or at least reduce distortions of the measuring tape, even under temperature variations of the working environment.

Such object is achieved, in accordance with the invention, by attaching the measuring tape to the first body at at least two points of attachment, arranged at a distance from each other along the longitudinal direction of the tape. Between the points of attachment, the measuring tape is elastically stretched in the longitudinal direction of the tape. The elastic stretching of the measuring tape creates a region in which the measuring tape will follow a thermally caused contraction of the first body and will also be able to contract, without losing its smoothness. In this fashion, unevennesses can be avoided, even in those cases where, in the first body and in the measuring tape, materials are used which possess greatly different thermal reactions to temperature variations. It is practical that the measuring tape be attached to the first body solely in the region of the longitudinally-opposite ends of the tape. However, one can also provide points of attachment between the tape ends, in particular in the case of measuring tapes which are very long. This is so because in the case of very long measuring tapes there is the risk that, in a built-in situation wherein the tape is located on a vertically lower side of the first body, the tape's central part will lift off the first body. This would impair the precision of the measurement.

Practice has shown that it is helpful to have the elastic stretching of the measuring tape amount to at least 30 $\mu$m, preferably at least 50 $\mu$m, and most preferably about 70 to 100 $\mu$m per linear meter of the measuring tape.

One can also conceive of a measuring tape that consists of an article produced by the meter that is drawn from a supply roll. Here again, the elastic stretching of the measuring tape is advantageous in order to stretch the measuring tape to such an extent that unevennesses or undulations possibly caused during winding or unwinding of the tape material will disappear.

Preferably, the measuring tape is made of a metallic material, although synthetic materials can also be considered for the measuring tape. What is essential is that the material for the measuring tape be selected in a manner such that the intentional extension of the measuring tape can be made to occur, at least to the greatest possible extent, if desired, exclusively within the elastic range as opposed to the plastic range. In particular, the material for the measuring tape can be selected in a manner such that the elastic stretch lies in the lower part of the elastic range, far from the limit of elasticity.

Theoretically, the measuring markings can be applied to the measuring tape in any desired form. In principle, there are no limitations to the design of the measuring tape and to the nature of the sensor arrangement's scanning of the measuring markings. Thus, the measuring markings can be read optically, inductively or capacitively, or else via magnetic resistances or Hall components or according to the principle of eddy-current formation. For instance, the measuring tape can feature an optically readable bar or line pattern or a magnetization pattern with alternating magnetic north and south poles, in order to provide the measuring markings. One can also conceive of providing the measuring tape with a conducting-wire pattern. A preferred form of embodiment of the invention, according to the first aspect, provides for the measuring tape to be equipped, in order to form the measuring markings, with thin zones or breakthroughs in the material, following each other along the length of the tape. If the sensor arrangement used to scan the measuring markings emits an electric or magnetic field and this field is affected by the material of the measuring tape, the thin zones or the breakthroughs of the material represent tape regions in which the permitivity or the permeability of the measuring tape differs from those regions that are not thinner or broken-through zones of the measuring tape. These variations in permitivity or permeability can be captured by the sensor arrangements—for instance by means of a field plate or a Hall sensor. Thus, one can use a metal screen tape with a relatively high nickel content—say, up to about 75% wt. Ni—in which one inserts (this, provided purely as a numerical example) at a graduation distance of about 1 mm, slits that are about 0.5 mm wide, separated from each other by bridges about 0.5 mm wide.

The measuring markings can comprise a group of markings which follow one another at regular distances along the length of the tape. If the distance between two consecutive markings is known, one can determine the length of the path covered by the second body from the number of the markings passed by the sensor arrangement. If the initial position of the second body is known, one can use the length of the path covered to determine the final position of the second body.

Alternatively or additionally, the measuring markings may comprise a group of reference markings which are designed and/or located on the measuring tape in a manner such that—even without knowing the initial position of the second body relative to the first body—one can make, by passing at the most a few consecutive reference markings, at least an approximate determination of the end position of the second body relative to the first body. Such reference markings are particularly advisable in connection with a track of regularly arranged measuring markings, for the purpose of quickly determining, after a functional or power failure of the sensor arrangement and the consequent loss of positional data on the second body, at least an approximate position of the second body. Here, the so-called distance-coded reference markings were found to be particularly suitable. In that case, pairs of reference markings, adjacent to each other along the length of the tape, feature distances between them which differ for at least a part of the pairs. If the distances between the reference markings of the individual pairs can be captured in table form—e.g., in an electronic memory—one can directly establish the position of the second body, at least approximately, by the measured distance between two of the adjacent reference markings passed by the sensor arrangement.

In a further development of the first aspect of the invention, it is provided that the first body is an elongated body with a longitudinal axis—in particular, a guide rail of a linear-guide arrangement—and that the measuring tape is applied to the elongated body in the direction of the longitudinal axis.

In order to provide this elongated body, one frequently cuts off a length of material from a material strand, at a cut-off point. For instance, the guide rails for linear-guide arrangements are often produced in the form of strands of a rail several meters long by means of a rolling process, a continuous-extrusion process or a continuous-casting process. Depending on the customer's wishes, individual lengths of rail are then cut off from these rail strands. If the pieces of rail can only be equipped with a measuring tape after having been cut to size from a rail strand, the procedure and the time delay will be very costly, since the elastic extension of the measuring tape must be carried out for each individual piece of rail. In addition, there may occur mechanical problems, considering that the pieces of rail cut to size are often of different lengths. As a result, the apparatus for clamping the pieces of rail and for stretching the measuring tape must be correspondingly adaptable or adjustable.

In order to simplify the manner of proceeding outlined above, the invention concerns, in a second aspect, a process for producing the arrangement according to the first aspect in which the first body is an elongated body which is cut off from a material strand as a length of material, at a cut-off point. According to the invention, it is provided in this process that a measuring tape be used, extending over a material section of the material strand, which material section is longer, if desired, by a multiple, than the length of material to be cut off. The measuring tape is at first attached to the material strand, under elastic stretching, only in the region of its longitudinally-opposite ends at points of attachment associated with the ends. The measuring tape is then attached to the material strand at additional points of attachment close to the cut-off point, on both sides of the cut-off point in the direction of the longitudinal axis. Next, the material strand together with the measuring tape are cut off between the attachment points which are close to the cut-off points.

With this process, the measuring tape is therefore not attached to the already cut-to-size length of the material strand, but rather before individual lengths are cut off from the material strand, according to the customer's wishes. In addition, one uses a measuring tape with a length that suffices not only for an individual length but can provide for several lengths, to be cut to size from one and the same material strand.

For instance, rail strands with a length of about 6 m are produced in a rolling mill. Next, one attaches to these rail strands a measuring tape which essentially reaches over the entire length of the respective rail strand. This measuring tape is attached with its tape ends to the rail strand and, in so doing, is stretched within the elastic range. Next, when individual pieces of rail are to be cut to size from this strand of rail, equipped along its entire length with the measuring tape, the measuring tape is additionally attached to the rail strand at strategically selected points, namely, on both sides of each of the selected cut-off points, after which the rail strand, together with the measuring tape, is cut off at the selected cut-off points. The result of this process is that the cut-off pieces of rail each carry a measuring tape which is attached with both its tape ends to the respective rail piece and which is under an elastic tension between its tape ends. Any possibly remaining length of the rail strand is equipped with a measuring tape, namely, the remaining length of the original measuring tape, which is attached at its two tape ends to the rest of the rail strand and is under an elastic tension between its tape ends. In this fashion, one can cut to size several rail pieces from one rail strand, while the procedure of measuring-tape stretching is only required once per rail strand.

In particular, if the strand of material used is a continuous strand, one can use a measuring tape which, while it is longer—in particular, much longer—than an individual length of this material strand that is to be cut off, it only extends over a limited partial length of the material strand.

In this second aspect, the measuring tape is preferably attached to the material strand by welding, particularly spot welding such as, for instance, in a resistance-welding process.

One often wishes to cover the measuring tape by some cover designed to protect it against mechanical factors and aggressive chemicals. In that case, it is theoretically possible to attach the cover only after the individual lengths had been cut to size from the material strand. However, in a preferred further embodiment of the process according to the second aspect of the invention, it is provided that, before the material strand is cut off, a measuring-tape cover is rigidly applied which is separate from the material strand and from the measuring tape and which extends over the length of the material section of the material strand. The measuring-tape cover is cut off at the cut-off point together with the material strand and with the measuring tape and, if desired, is attached to the material strand and/or the measuring tape, before the cut off, close to the cut-off point. This has the following advantage: the material strand with the measuring tape attached to it is often not subdivided immediately into individual lengths, at its production site, but rather is supplied to a post-processing company which places it in storage and at the proper time cuts off the individual lengths, according to the desired customer application. If during this time the measuring tape is left unprotected one cannot exclude the possibility of damage to the measuring tape. However, if the measuring-tape cover is attached to the uncut material strand one can achieve an early and complete encapsulation of the measuring tape which will protect it against subsequent factors capable of occurring during the transportation, warehousing or subsequent processing of the material strand.

For the cover of the measuring tape, a cover tape can be used which is attached, if desired in an essentially continuous manner, to the material strand along the longitudinal edges that run in the direction of the longitudinal axis of the strand. However, other forms of coverage can also be used. For instance, the measuring tape can be built into a longitudinal groove of the material strand and the groove then filled with a hardenable cover mass.

According to a third aspect, the invention concerns an arrangement for determining the relative position of two bodies capable of motion in relation to each other, wherein a first of the two bodies carries measuring markings distributed over a marking range and the second of the two bodies carries a sensor arrangement which responds to the measuring markings, which sensor arrangement travels over the marking range, in the course of relative motion of the two bodies, and in which the measuring markings are covered by a cover tape which is separate from the first body. With a flat side turned towards the first body, the cover tape lies on supporting surfaces of the first body and is attached to the first body, by at least one longitudinal welding seam, along its two longitudinal edges that run in the longitudinal direction of the tape. In this case, the arrangement can be designed in particular in accordance with the previously described first aspect, and can be produced within the framework of the earlier process, according to the second aspect.

It often is impossible to avoid tolerances in the width of the cover tape. Thus, it cannot be excluded that the cover tape will vary in width along its length, even if such variability is small. It can also occur with the longitudinal welding seams that the seams cannot be applied with exact straight-line accuracy, but only with certain deviations from an exact straight-line accuracy. It is possible to apply the longitudinal welding seams directly to the longitudinal edges of the cover tape. However, the two effects discussed earlier—tolerances in the width of the cover tape and lack of straight-line accuracy of the longitudinal welding seams— can also bring about, at certain points along the cover tape, that to a greater or lesser extent in the welding the cover tape is missed and the weld is applied "to the air." This can cause leaky welding points. In addition, in this fashion one transfers varying amounts of heat to the cover tape along the cover tape. The heat transfer during welding causes thermal stresses in the material of the cover tape, which stresses can manifest themselves in a deformation of the cover tape. Such non-uniform heat inputs can cause an irregular deformation of the cover tape, which can also produce a considerable negative effect on the welding result.

Consequently, a third aspect of the invention is based on the object of providing an improved way of achieving a better welding result when welding the cover tape.

In order to achieve this object, the third aspect of the invention provides that the longitudinal welding seams run at a distance, in the direction crosswise to the direction of the tape length, from the respectively adjacent longitudinal edge of the cover tape and that they form a material fusing zone of the cover tape with the first body, in the region of the supporting surfaces.

Because in this solution, the longitudinal welding seams are applied at a distance from the longitudinal edges of the cover tape, a uniform heat input over the length of the cover tape is ensured. In this fashion, one always melts essentially identical amounts of material of the cover tape and fuses them with the first body. It was found that this promotes a reduction in the deformations of the cover tape caused by the welding. In addition, one avoids the occurrence of leaky welding points.

The measuring markings can be sunk into a relief-like depression of the first body, wherein the cover tape will practically be inserted into the relief-type depression. In this fashion, not only can the measuring markings be protected, but also the cover tape, against the overwhelming majority of mechanical damage.

The cover tape in particular can be inserted into this relief-like depression in a manner such that the outer surface of the cover tape lies approximately flush with the adjoining surface regions of the first body. In this fashion, one achieves an essentially stepless transition between the cover tape and the first body, in a manner such that one generates an outer surface of the structural unit "first body/cover tape" which is essentially free of unevennesses. If desired, the above would facilitate a perfect sealing of the second body with respect to the first body. This is so because, particularly in the case a of linear-guide arrangement with a slide traveling on a guide rail, the slide is often designed with a seal which is in sealing contact with the guide rail and which prevents the penetration of dirt into the slide and the leakage of lubricant from the slide. By means of an essentially flush insertion of the cover tape into the guide rail one can prevent the occurrence of wear at the seal of the slide, or even the need for modification of the form of sealing.

The welding method according to the third aspect of the invention has a particular advantage in the previously mentioned case, in which the cover tape is inserted in an approximately flush manner into the relief-like depression. In this case, if one were to apply the longitudinal welding seam to the abutting region between the longitudinal edges of the cover tape and the lateral flanks of the relief-like depression, one would run the risk of negatively impacting the welding process due to the gap which could appear between the cover tape and the lateral flanks of the relief-like depression, because of the tolerances in width of the cover tape and/or of the relief-like depression. By applying the longitudinal welding seams as above according to the third aspect of the invention, not in the abutting regions between the cover tape and the relief-like depression but rather towards the middle of the tape, one no longer need take into account such a gap. The cover tape can be produced with greater tolerances in width. At the same time, greater tolerances in manufacture can also be accepted for the relief-like depression. Instead of butt welding, one can weld through the cover tape with the material fusing of the cover tape with the first body occurring in the ideal case entirely in the region of the supporting surfaces of the first body.

A particular advantage is achieved if the relief-like depression is designed as a stepwise depression, and the supporting surfaces for the cover tape are formed by a supporting-step arrangement of the depression. In that case, one can ensure that the measuring markings remain unaffected by the welding process, even if that process does not occur directly at the longitudinal edges of the cover tape but rather is shifted towards its center. This is so because, via the stepwise design of the relief-like depression, one can apply the measuring markings at a point of the depression which is deeper, compared to the supporting-step arrangement, so that they are well protected from the heat generated during welding.

It is preferred that the cover tape be applied to the first body by means of laser welding. This is advantageous because, by means of laser welding, one can achieve very narrow welding seams, a comparatively small melting zone is produced and the melting duration is kept relatively short. As a result, there is no risk of negative effects upon the measuring markings caused by heat generation during laser welding.

Nor are welding processes other than laser welding excluded in principle. Thus, it is conceivable that one can apply the cover tape to the first body alternatively by means of electron-beam welding or plasma welding.

In principle, one could integrally incorporate the measuring markings into the material of the first body, for instance by etching in the depressions, or by impressing magnetic states. However, a further embodiment of the third aspect of the invention provides that the measuring markings are arranged on a markings carrier which is separate from the first body and from the cover tape. This markings carrier can be, for instance, a metal tape into which one incorporates, at regular and/or a periodic intervals, slits designed as measuring markings.

The invention further concerns, according to a fourth aspect, a process for producing an arrangement for determining the relative position of two bodies capable of motion relative to each other, wherein a first of the two bodies carries measuring markings distributed over a marking range and the second of the two bodies carries a sensor arrangement which responds to the measuring markings and which travels the marking range in the course of a relative motion between the two bodies. In this process, the measuring markings are covered by a cover tape, separate from the first body. The cover tape with its flat side turned towards the first body is laid onto supporting surfaces of the first body, and is attached to the first body along the two edges that run along the longitudinal tape direction, by at least one respective longitudinal welding seam. This process is particularly suitable for the production of the arrangement according to the first aspect and/or the third aspect.

According to the invention, it is provided in the process according to the fourth aspect that the longitudinal welding seams are applied at a distance, in the direction crosswise to the longitudinal direction of the tape, from the respectively adjacent longitudinal edge of the unwelded cover tape in a manner such that the welding causes a material fusing of the cover tape with the first body, if desired, exclusively in the region of the supporting surfaces. Here, what had already been stated earlier with respect to the third aspect of the invention essentially applies.

The advantages derived from the fact that one welds at a distance from the longitudinal edges of the cover tape remain operative even if one wishes to cut off the edge strips of the cover tape which remain outside the longitudinal welding seams. This can be done after welding. It is also conceivable that one could already cause a separation of these edge strips during welding, by selecting the welding process in a manner and by keeping the welding energy at a level such that a welding cut results.

According to a fifth aspect, the invention concerns a process for producing an arrangement for determining the relative position of two bodies capable of moving in relation to each other, wherein a first of the two bodies carries measuring markings distributed over a marking range and the second of the two bodies carries a sensor arrangement responding to the measuring marking, the sensor arrangement traveling over the marking range in the course of a relative motion of the two bodies. In this process, the measuring markings are covered by a cover tape, separate from the first body, which is attached to the first body along its two longitudinal edges running in the direction of the tape length, by means of at least one respective longitudinal welding seam. This process is particularly suitable for the production of the arrangement according to the first aspect and/or the third aspect.

This fifth aspect of the invention is based on achieving the object of keeping at a low level the deformations of the cover tape which could be caused by the heat generated during welding.

In this connection, it is proposed according to the invention that longitudinal welding seams adjacent to two different edges of the cover tape be applied essentially simultaneously. This is so because it was found that, if one first welds along only one of the longitudinal edges, comparatively heavy deformations of the cover tape in its tape plane are to be expected. The resulting warping of the cover tape can have the consequence—particularly if the cover tape is rather long, e.g., several meters—that the cover tape is no longer capable of being welded in a proper fit to the first body. In order to counteract this in the fifth aspect of the invention, one welds simultaneously along both longitudinal edges of the cover tape. In so doing, the tendency towards warping of the cover tape in its tape plane, caused by welding on the one longitudinal edge, is essentially canceled by the tendency towards warping caused by the welding at the other longitudinal edge. As a result, the cover tape remains essentially straight and free of warping.

It is particularly advisable to apply the essentially—simultaneously—applied longitudinal welding seams in the same welding direction. In so doing, it is practical to apply the welding seams jointly, starting at one and the same lengthwise end of the cover tape.

The longitudinal welding seams which are applied essentially simultaneously can be applied by means of a laser welding apparatus with bifocal optics. Such laser welding devices are available. For instance, they are offered by the firm Haas-Laser GmbH as a variety of high-performance laser devices, such as for instance the one designated Type HL 3006 D.

BRIEF DESCRIPTION OF THE DRAWINGS

For a better understanding of the invention, reference may be made to the following description of representative embodiments thereof, taken in conjunction with the accompanying drawings, in which.

DETAILED DESCRIPTION

Figure 1:
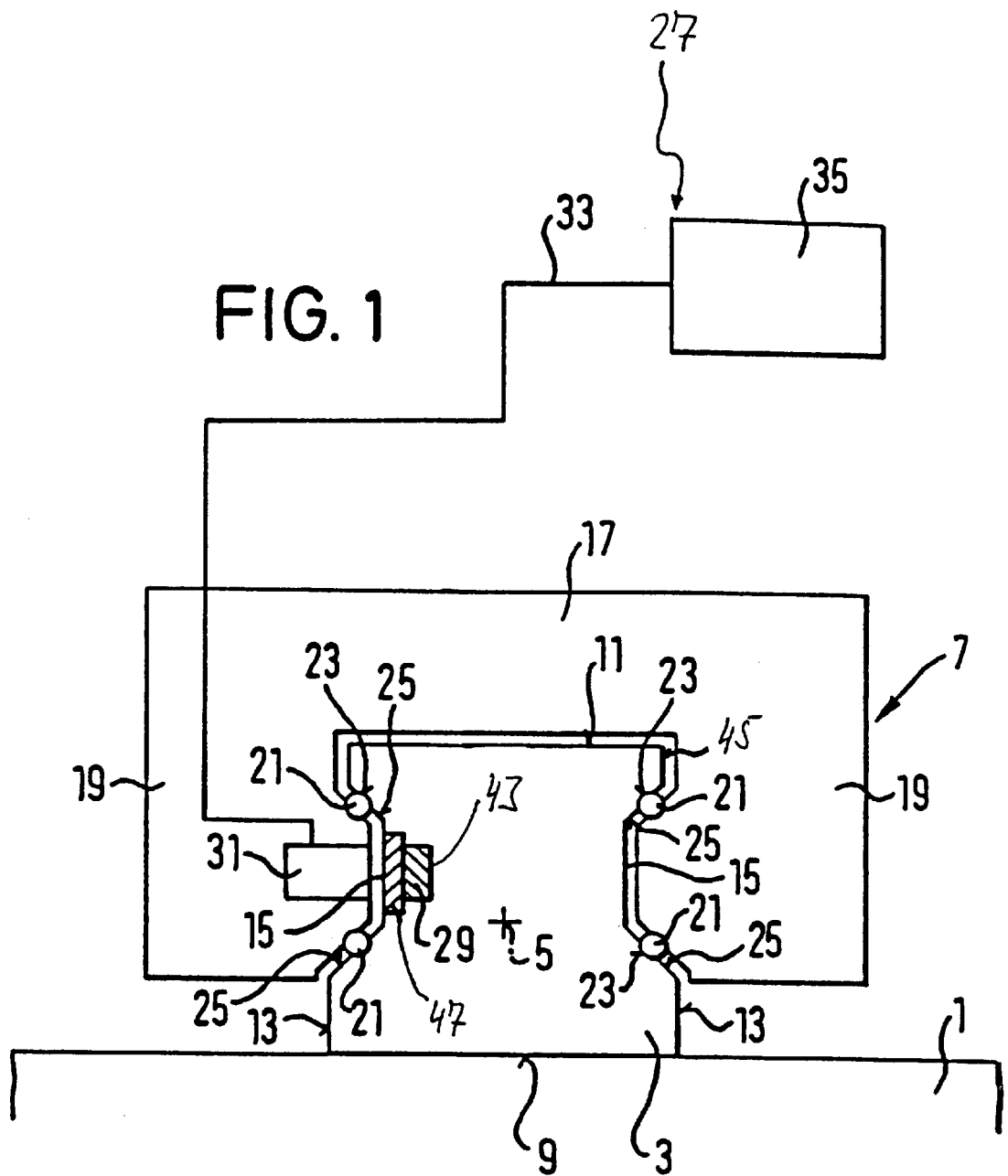
FIG. 1 is a schematic view, in cross section, of a linear-guide arrangement in which the various aspects of the invention can be embodied.

FIG. 1 shows a linear-guide arrangement with a guide rail 3 fastened on a support base 1 and a runner 7 guided in a mobile manner on the guide rail 3 along a rail longitudinal axis 5. The guide rail 3 has a fastening surface 9 with which it rests on the support base 1, a head surface 11 which lies opposite to the fastening surface 9, as well as two lateral surfaces 13 which connect the fastening surface 9 to the head surface 11. The lateral surfaces 13 of the guide rail 3 are each equipped with a trapezoidal-shaped recess 15. The guide rail 3 is rigidly screwed onto the support base 1 by means of threaded bolts (not shown), which are arranged at regular intervals along the longitudinal axis 5 of the rail and which traverse the guide rail 3, starting at the head surface 11.

The runner 7 envelops the guide rail 3 in an approximately U-shape, whereby its bridge region 17 lies adjacent to the head surface 11 of the guide rail 3 and its two leg regions 19, connected by the bridge region 17, lie adjacent to the lateral surfaces 13 of the guide rail 3. The runner 7 is guided on the guide rail 3 in rolling fashion by infinite rolling-element loops 21 which are supported on the guide rail. The rolling-element loops 21 are arranged in the leg regions 19 of the runner 7. Their rolling elements roll on races 23 of the guide rail 3, which races are formed in the angled flanks (designated by 25) of the trapezoidal-shaped recesses 15. Each of the two leg regions 19 of the runner 7 carries two rolling-element loops 21 in a fashion such that they lie symmetrically to a longitudinal central plane of the guide rail 3 which contains the longitudinal axis 5. The rolling elements of the rolling-element loops 21 can be, for instance, balls, rollers, barrels, or needles.

Various possibilities exist for use of the linear-guide arrangement. Thus, they may be used for instance in machine tools for the moving guidance of tools or of workpieces, in handling devices, or in measuring systems. In all these cases, it is often necessary to determine precisely the relative position of the runner 7 along the guide rail 3, for instance in order to be able to control precisely the machining process on a workpiece. For that purpose, the linear-guide arrangement includes a position-measuring arrangement generally designated by 27, which comprises, as basic components thereof, a measuring tape 29 held against the guide rail 3 and a sensor head 31 carried by the runner 7. The measuring tape 29 is laid out essentially over the entire length of the guide rail 3—or, in any event, over the entire moving range available to the runner 7 with respect to the guide rail 3, in the latter's axial direction. When the runner 7 moves relative to the guide rail 3, the sensor head 31 scans the measuring tape 29 and delivers, over a measuring-signal line 33, the appropriate sensor signals to an evaluation circuit 35. The circuit 35 may be microprocessor-supported and programmed to determine the position of runner 7 along the guide rail 3 on the basis of the sensor signals it captures. The sensor head 31 is preferably arranged on the runner in the position immediately opposite to the measuring tape 29, in a manner such that the scanning of the measuring tape 29 by the sensor head 31 is disturbed as little as possible by external influences such as, say, external electromagnetic fields. In this case, it is conceivable that the sensor head 31 be shielded against external interfering fields, by means of special shielding elements.

Figure 3:
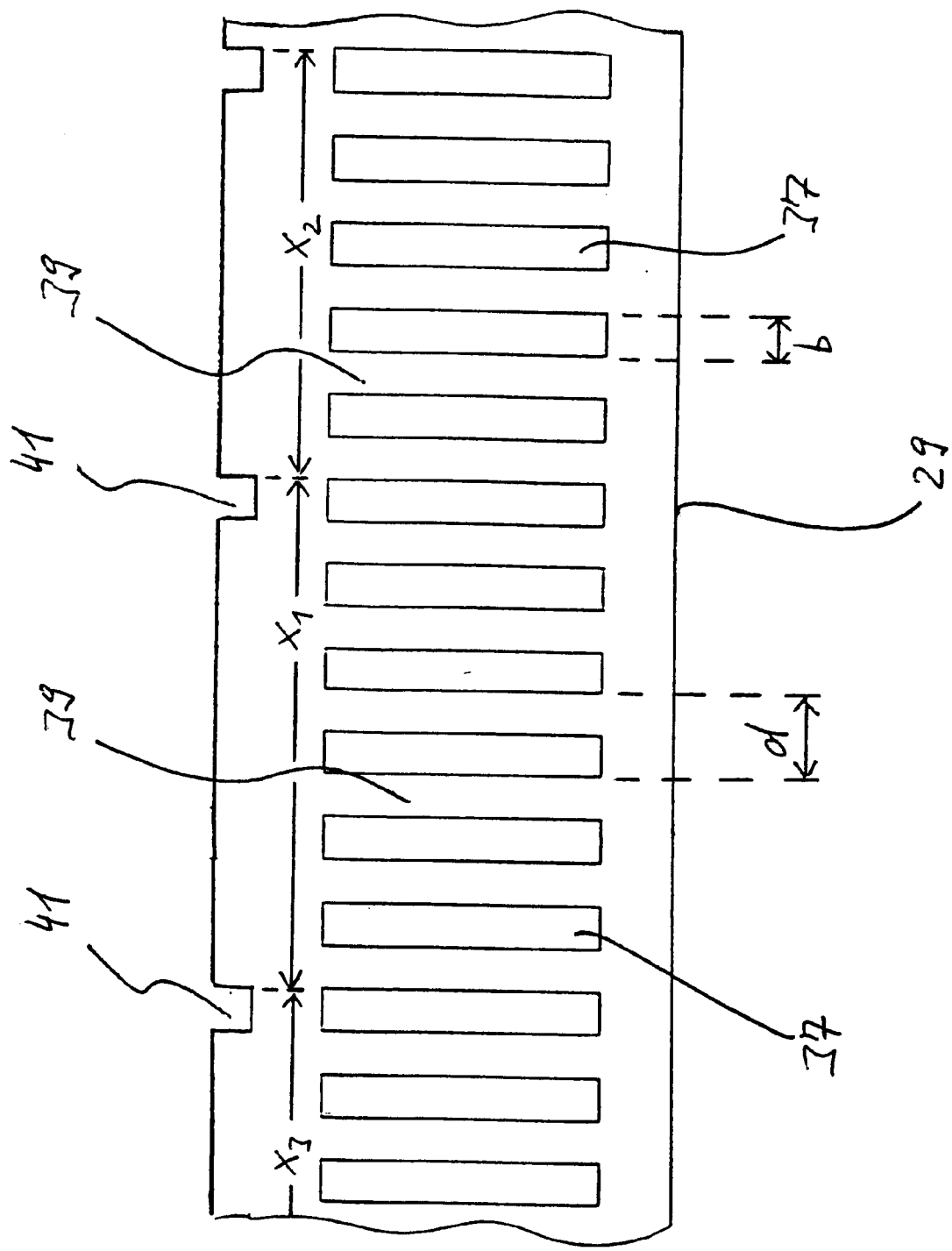
FIG. 3 is an elevational view of the measuring tape of FIG. 2.

A section of the measuring tape is shown in FIG. 3. The tape includes a multiplicity of equidistant slits 37, which are incorporated into the measuring tape 29 consecutively in the longitudinal direction of the measuring tape 29 and are separated from one another by bridges 39. The distance between two consecutive slits 37 corresponds to the graduation of the measuring tape 29. This distance is designated "d" in FIG. 3 and may amount to, for example, 1 mm. The width of the slit 37 is designated "b" and amounts to, for example, 0.5 mm. In such case, the bridges 39 are also preferably 0.5 mm wide.

The measuring tape 29 is preferably made of metal, for example, steel with a comparatively high content of nickel. In that case, the bridges 39 form zones of higher magnetic permeability, while the slits 37 form zones of lower magnetic permeability. In order to scan the measuring tape 29, one can use, for instance, a field plate with magneto resistors which are magnetically precharged by a permanent magnet. Alternatively, one can use, for example, a Hall probe. The alternating permeability of the measuring tape 29, which tape has a grid-like structure, causes periodic fluctuations in the magnetic flux density when the field plate or the Hall probe travels along the measuring tape 29. The fluctuating magnetic flux density provokes voltage or current changes in the sensing component of the sensor head 31, be it a field plate or a Hall sensor or another component, which changes are delivered as sensor signals to the evaluation circuit 35. The sensor signals may display a high-frequency sinusoidal base oscillation, whose amplitude is modulated in accordance with the fluctuating magnetic flux density. The evaluation circuit 35 transforms these amplitude variations into a sequence of pulses. The pulses may have any desired shape. Thus, the pulse train may have, for instance, sinusoidal, rectangular or triangular shapes. It is also conceivable that a pulse train will consist of approximately ideal pulses. If the measurement graduation, i.e., the distance "d" between two slits 37 which serve as measuring markings, is known and each pulse contained in the sensor signal corresponds to a slit 37 (or bridge 39) passed by the sensor head 31, one can determine the distance covered by the runner 7 along the guide rail 3 by means of the number of pulses supplied by the sensor head 31. If the initial position of the runner 7 is known, the distance covered will permit the determination of the momentary position of the runner 7. It is practical to carry out a referencing of the position-measuring arrangement 27, before starting the work of the linear-guide arrangement, in order to obtain reference measurements such as, for instance, for the end positions of the runner 7 on the guide rail 3 and/or for other outstanding positions of the runner 7. These reference measurements serve in the working operation of the linear-guide arrangement as a basis for determining the actual relative position of the runner 7 on the guide rail 3.

It is conceivable that the response reference-measurements may be lost, as, for example, in the case of an outage in the voltage supply for the position-measurement arrangement 27. In order to avoid having to carry out a repeat referencing of the measuring system, the measuring tape 29 preferably carries, next to the slits 37 which form a first track of measurement markings, distance-coded reference slits 41 in a further parallel track, which reference slits 41 permit a quick determination of the position of runner 7. In such case, adjacent pairs of the reference slits 41 have respectively different distances from one another. For instance, in FIG. 3, the left hand and the central reference slit 41 are at a distance x1 from each other, while the distance between the central slit 41 from the right-hand slit 41 is x2. The left hand reference slit 41, in turn, is at a distance x3 from the next reference slit on the left.

The evaluation circuit 35 can distinguish, among the sensor signals it receives, the signal pulses which are derived from a passing of reference slits 41 from the signal pulses which are derived from the passing of slits 37. For instance, the sensor head 31 may contain two separate sensor elements, one of which one scans the track of slits 37 and the other the track of reference slits 41. The evaluation circuit 35 can then compute the distance between two consecutive reference slits 41 from the number of signal pulses triggered by slits 37 when the distance between two consecutive reference slits 41 is traveled. The distances between two adjacent reference slits 41, which differ from pair to pair, are stored in table form in the evaluation circuit 35. The actual position of runner 7 along the guide rail 3 can be determined based upon the runner 7—and with it the sensor head 31'moving over and beyond two consecutive reference slits 41, computing the distance between the two reference slits 41, and searching the previously stored table for information on which pair of reference slits 41 has this computed distance and where the pair of reference slits 41 is located along the measuring tape 29.

In order to obtain information on the direction of movement of the runner 7 on the guide rail 3, the sensor head 31 may include two sensor elements, arranged in an offset manner in the longitudinal direction, both of which scan the track of slits 37. The phase-shifted signals supplied by the two sensor elements will then make it possible to determine the direction of the runner's movement. In principle, one can also think in terms of providing the measuring tape 29 with two parallel tracks of slits 37 with the same measurement graduation, but arranging the slits 37 of the two tracks so as to be offset from one another. The scanning of the two tracks can then be carried out by means of two sensor elements, not offset in relation to each other.

The possibility of capturing the longitudinal and/or angular position of a rotating body is also conceivable within the framework of the invention. In this case, one can arrange a measuring tape having one or more tracks of measuring markings along a circular arc or along a spiral line on the rotating body. For instance, with a suitable multiplicity of tracks, a respective track could be used as an angular measure; and the individual measuring-markings of the respective track could be used to determine the position in a longitudinal direction. This principle can also be used in the case when a sensor head can move, in relation to a plane surface, in two directions of motion that are orthogonal to each other.

With an appropriate design of the sensor circuits and the computing stage following it, one can also conceive of an a periodic pattern of the slits 37, in lieu of the periodic arrangement of slits 37. For instance, such an arrangement would be useful if a greater resolution is required in specific longitudinal sections than in other longitudinal sections.

In principle, one can also think of any desired sequence or profile of markings, as determined by one skilled in the art in each specific case.

If possible, one should avoid having to replace the measuring tape 29 during the life of the linear guide arrangement. However, inasmuch as occasionally very rough operating conditions prevail, in particular in machine tools, it is desirable that the measuring tape 29 be housed in an absolutely safe manner on the guide rail 3. In other words, the tape 29 should be protected against mechanical effects such as shocks or impacts, against the effect of coolants and lubricants, against the action of any other aggressive chemicals, and, if desired, also against the influence of external fields such as magnetic fields which could be generated by a linear motor. It is furthermore desirable that the measuring tape be arranged on the guide rail 3 in a manner such that, in the case of shaking or oscillation stresses, the linear guide arrangement is protected against the risk of the measuring tape 29 sliding or even coming loose.

In the linear-guide arrangement shown in FIG. 1, the measuring tape 29 is housed in a longitudinal groove 43 which runs in the direction of the longitudinal axis 5. The groove 43 forms a channel to receive the measuring tape 29 and is formed in the external surface of the guide rail designated by 45. Preferably, the longitudinal groove 43 is provided in one of the lateral surfaces 13 between the running tracks 23, in particular, on the bottom of the trapezoidal-shaped recess 15 in the lateral surface 13. Conceivably, an alternative could consist of incorporating such a longitudinal groove 43 into the head surface 11 of the guide rail 3, or into supporting base 1, and to recess the measuring tape 29 into it.

The measuring tape 29 is fully sunk into the longitudinal groove 43. For the protection of the measuring tape 29, one provides a cover tape 47 which completely encapsulates the measuring tape 29 in the longitudinal groove 43. It protects the measuring tape 29 against the dangers of the external influences described earlier. The scanning of the measuring tape 29 by means of sensor head 31 is not hindered by the cover tape 47. The cover tape 47 is preferably composed of metal; for instance, the cover tape 47 may be made of a metal foil about 0.1 mm thick. If the magnetic permeability of the metal cover tape 47 is overall uniform, the scanning of the alternative magnetic permeabilities of the measuring tape 29 is not interfered with by the cover tape 47.

Figure 2:
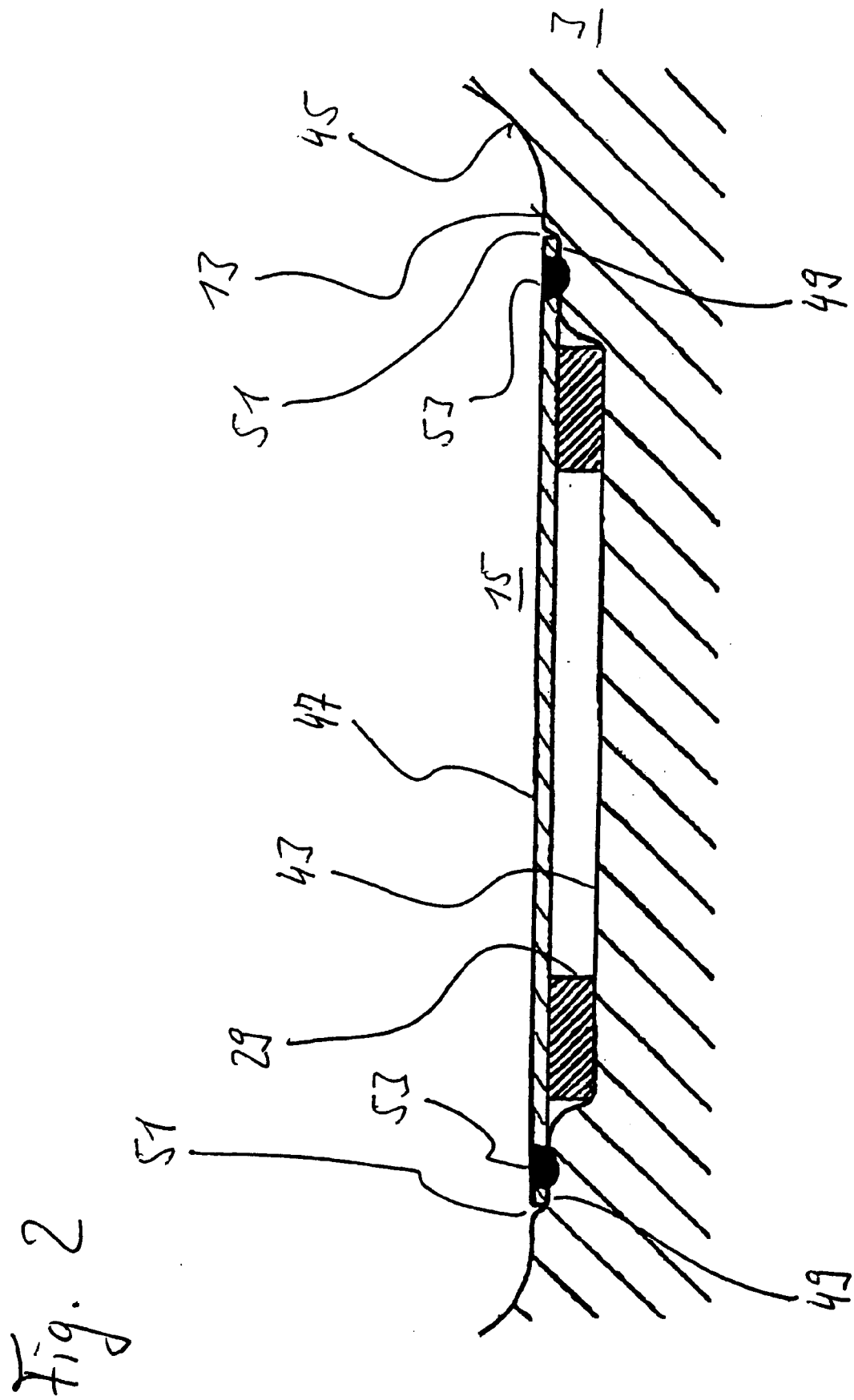
FIG. 2 is a partial cross-sectional view of a guidance rail of the linear-guide arrangement shown in FIG. 1, with a measuring tape built into a step-wise groove and covered by a cover tape.

With reference to FIG. 2, the measuring tape 29 lies flat on the bottom of longitudinal groove 43. As explained further below, it is only attached to the guide rail 3 by welding at its ends. In certain cases, it can be pressed into the longitudinal groove 43 in a manner such that, between its ends, the tape is secured against lifting off the guide rail 3 by means of frictional adhesion to the flanks of the longitudinal groove 43. This can be the case in particular if the cover tape 47 does not lie directly on the measuring tape 29 but rather there exists a small distance between the two tapes.

If the cover tape 47 and the measuring tape 29 are viewed in transverse cross section (as shown in FIG. 2), the cover tape 47 may be seen to extend on both sides beyond the measuring tape 29. It lies with each of its two lateral edge sections, which project beyond the measuring tape 29, on a respective supporting step 49 formed in the respective flanks of the longitudinal groove 43. The support steps 49 thus form supporting surfaces for the cover tape 47. The support steps 49 in the longitudinal groove 43 are designed and dimensioned in such a manner that there exists an, at least approximately, flush transition to the adjacent surface regions of the guide rail 3. When referring here to an approximately flush transition, the fact should be taken into account that occasionally one cannot avoid the existence of a small gap between the narrow longitudinal edges of the cover tape 47 and the lateral edges of the longitudinal groove 43. Such a gap is illustrated at 51 in FIG. 2 adjacent both lateral edges of the cover tape 47. It can be caused by the fact that the longitudinal groove 43, by its production method, does not feature sharp-edged step transitions, but rather only rounded step transitions. This, for instance, is the case if the longitudinal groove 43 is incorporated into the guide rail 3 by means of a grinding wheel. It is true that the gap 51 will generally be so small that its effect on sealing the runner 7 against the guide rail 3 will be, at most, only negligible. Nonetheless, these gaps 51 may be deleterious from another viewpoint: in order to seal the measuring tape 29 hermetically against the outer environment, the cover tape 47 is welded along each of its two lateral edges against the guide rail 3. The corresponding welding seams are designated by 53 in FIG. 2. The preferred welding method is laser welding. In principle, it is also conceivable to use electron-beam welding or plasma welding. If one now tries to butt weld the cover tape 47 against the guide rail 3, i.e., to weld at a place where the narrow sides of cover tape 47 abut the lateral flanks of longitudinal groove 43, the gap 51 could have a negative effect on the welding. In addition, dimensional tolerances of the cover tape 47 and of the longitudinal groove 43 could lead to variations in the size of gap 51 along the length of the guide rail 3. This could also cause greatly differing weld results along the guide rail 3. For this reason, it is preferred to weld not directly at the lateral edges of the cover tape 47, but somewhat shifted towards the middle of the tape. Consequently, the welding is performed in a manner such that a material fusing of the cover tape 47 with the guide rail 3 occurs in the region of the supporting surfaces for the cover tape 47, formed by the support steps 49. One can thus weld through the cover tape 47. The result of this welding method can be seen in FIG. 2. The welding seams 53 run at a distance from the respectively adjacent lateral edge of the cover tape 47. Essentially, no material melting of the cover tape 47 and, in particular, no material fusing of the cover tape 47 with the guide rail 3, is noted directly at the lateral edges of the cover tape 47. By way of numerical examples, one could provide the following: with a width of the cover tape 47 of about 6.9 mm and a width of the welding seams 53 of about 0.3 mm each, the distance from the center of a welding seam 53 to the adjacent lateral edge of the cover tape 47 could be about 0.4 mm.

In this connection, laser welding has proven to be particularly suitable because it allows very small melting zones, so that the welding seams 53 can be applied with good precision. The shifting of the welding seams 53 towards the center of the cover tape 47 has essentially no effects on the measuring tape 29 and its measuring markings. This is so because the range of thermal transfer, particularly in the case of laser welding, is so small that there is no need to fear an effect on the accuracy of the measuring markings by the heat generated during welding.

Figure 4:
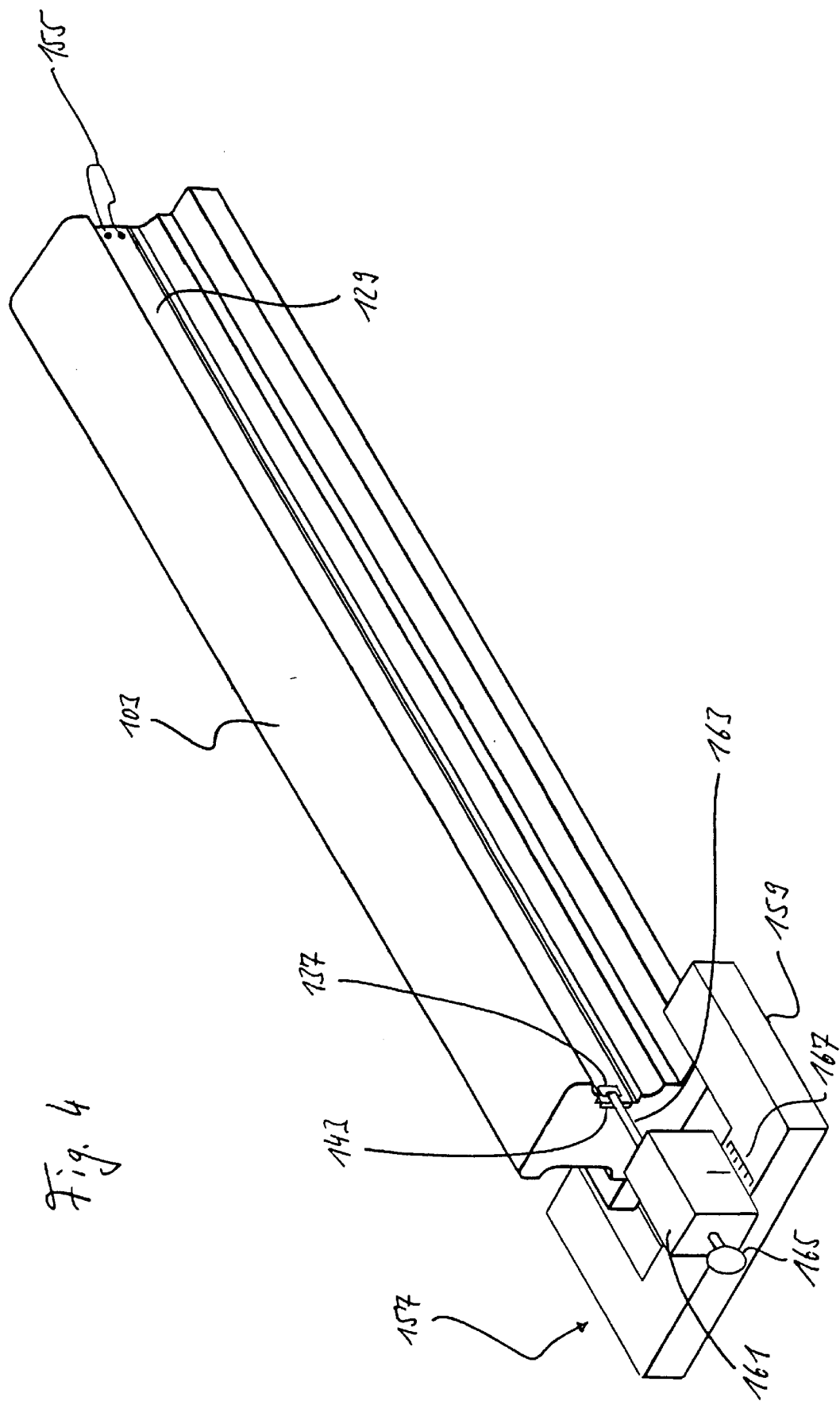
FIGS. 4–6 are schematic views illustrating process steps in producing the linear-guidance arrangement shown in FIG. 1.
Figure 5:
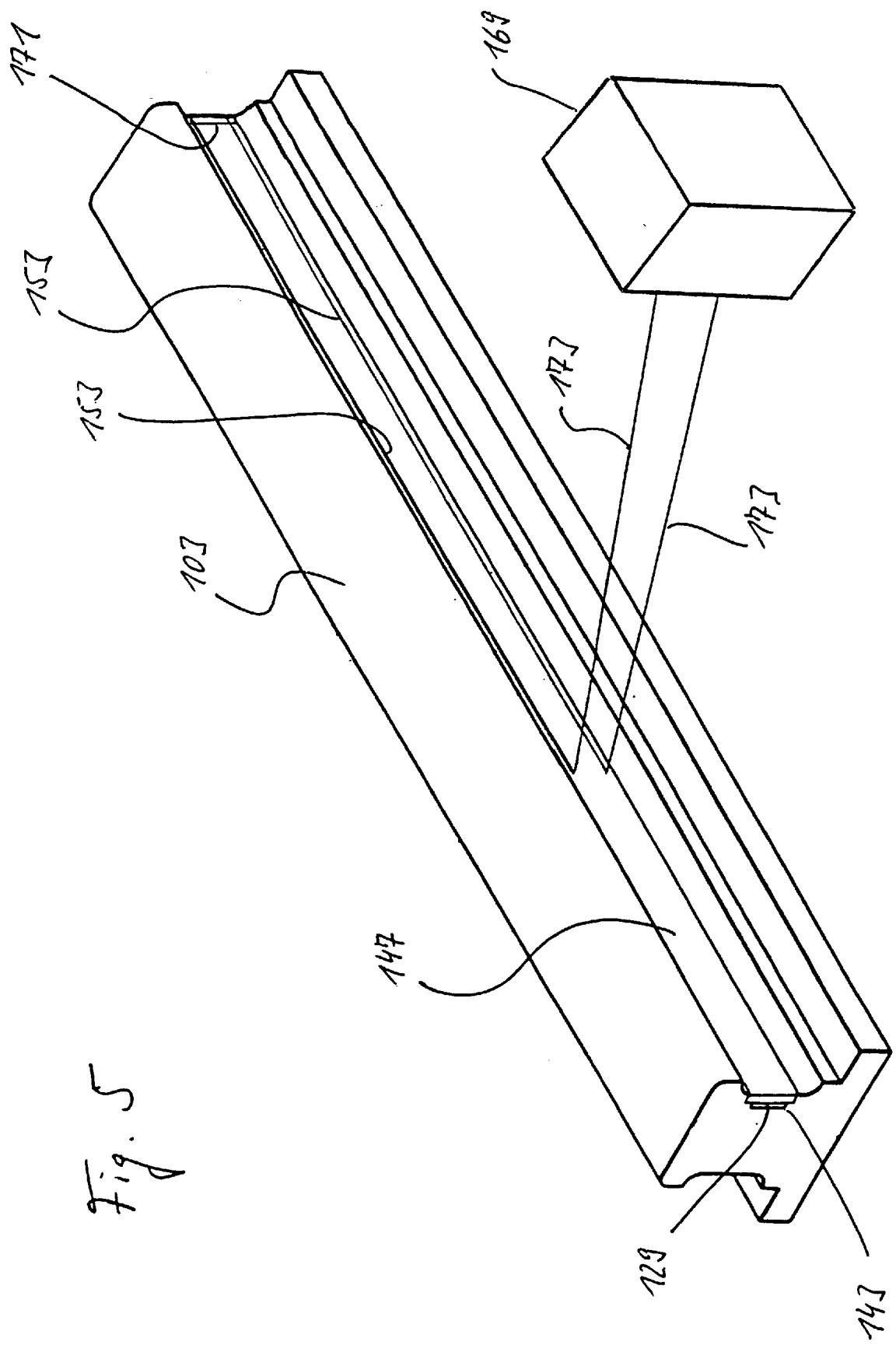
Figure 6:
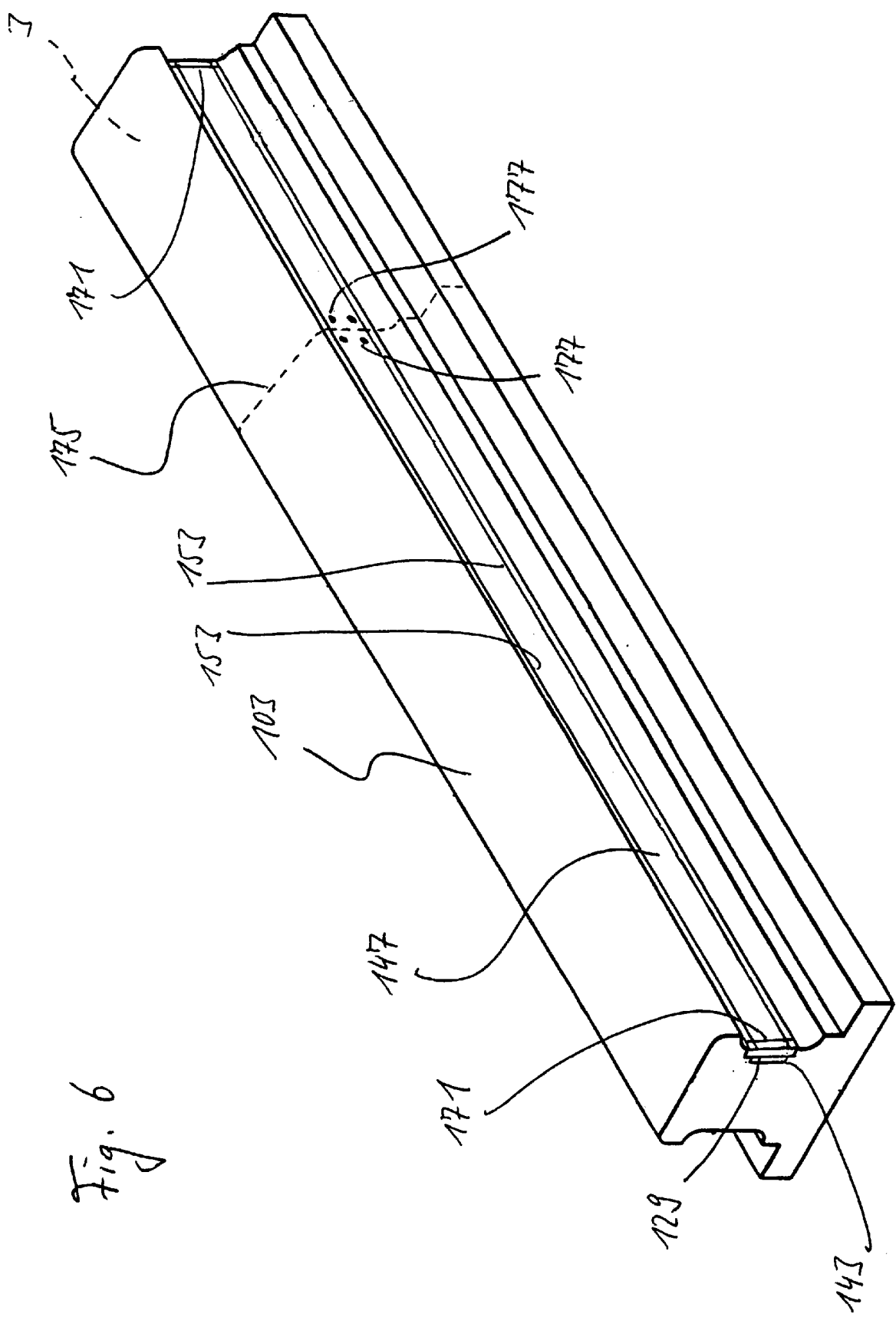

In FIGS. 4–6, the same reference numbers are used, but increased by 100, to identify the same or equivalent components as those in FIGS. 1—3. Except as stated otherwise below, the description of the components in the preceding explanations referring to FIGS. 1–3 is applicable to FIGS. 4–6 as well.

As a rule, the guide rail 3 of the linear-guide arrangement according to FIG. 1 is cut to the length desired for a particular application size from a rail strand. The rail strands are produced with a standard length of, say, 6 m, or as a continuous strand, by rolling, continuous casting or continuous extrusion. Such a rail strand is shown in FIG. 4, where it is designated by reference number 103. This rail strand 103 is provided with a measuring tape 129, essentially over its entire length, before it is subdivided into individual rail pieces. The measuring tape is attached with one of its tape ends to the rail strand 103, preferably by resistance spot welding. For that purpose, welding spots 155 are indicated in FIG. 4. The measuring tape which is inserted in a longitudinal groove 143 of the rail strand 103 in this case is stretched not only to an extent sufficient that it will lie essentially flat in the longitudinal groove 143 but, also, it is elastically stretched by means of a stretching device 157 before it is attached also at the other tape end to the rail strand 103. The highly schematic stretching device 157 shown can comprise a clamping part 159, which can be clamped onto the rail strand 103, and an active part 161, which can be adjusted relative to the clamping part 159. The active part can grip by means of a gripper 163 onto the measuring tape 129. For instance, the gripper 163 can grip into a slit 137 which serves as a measuring marking of the measuring tape 129. In order to shift the active part 161 in relation to the clamping part 159, one can provide, say, a micrometer screw 165. The shifting measure can be read from, say, a scale arrangement 167. After the operation of the micrometer screw 165 has provided the desired stretching of the measuring tape 129, e.g., about 70–100 μm per linear meter, the measuring tape 129 is also attached against the rail strand 103 at its tape end opposite to the welding spots 155, preferably, once again, by means of spot welding. In such case, the measuring tape 129 is maintained in an elastic stretched pretension between its tape ends, by which any possible undulations of the measuring tape 129 are eliminated. Such undulations may occur if one uses, for the measuring tape 129, a tape material unwound from a supply roll. Initially there is no further attachment of the measuring tape 129 to the rail strand 103 between the spot welds at the tape ends.

Next, the measuring tape 129 is covered with a cover tape 147 which is inserted in the longitudinal groove 143, essentially over the entire length of the rail strand 103, and then welded to the rail strand 103. This step is shown in FIG. 5. In order to weld the cover tape 147 against the rail strand 103, one applies, by means of a schematically indicated welding device 169, one longitudinal welding seam, 153 each along the two longitudinal lateral edges of the cover tape 147, at a small distance inward from the lateral edge. The longitudinal welding seams 153 are applied simultaneously, starting from one of the ends of the cover tape 147. This assures that the lowest possible deformation of the cover tape 147 will occur during welding. The longitudinal welding seams 153 extend in an uninterrupted manner essentially over the entire length of the cover tape 147. In addition, one can apply a crosswise welding seam 171 to the ends of the cover tape 147, in order to achieve a complete encapsulation of the measuring tape 129 under the cover tape 147.

The welding device 169 is preferably a laser welding device with bifocal optics, which admits two laser beams 173 of equal intensity. Here again, however, the possibility of using alternative welding processes such as electron-beam welding is not at all excluded.

FIG. 6 shows the condition in which the cover tape 147 is fully attached to the rail strand 103. The measuring tape 129 is then lying immobilized in the longitudinal groove 143. From the rail strand 103 so prepared, one can now cut to size individual rail pieces, with the covered measuring tape secured thereto, according to the customer's wishes. In FIG. 6, a scheduled cut-off point is indicated by the broken line 175. It indicates the point where, as an example, the rail piece 3 which is to be used in the linear-guidance arrangement of FIG. 1 is to be cut off from rail strand 103. Before the rail strand 103 is cut at the cut-off point 175, the measuring tape 129 is attached locally on both sides of the cut-off point 175. For that purpose, one places weld spots 177 to the right and left of the cut-off point 175 in the longitudinal direction of the rail strand 103. The weld points 177 traverse the cover tape 147 and cause a point-like fusing of the measuring tape 129 with the rail strand 103. Such fusing of the measuring tape 129 with the rail strand 103, close to the cut-off point, makes it possible to separate the rail piece 3 without loss of the state of elastic stretching of the measuring tape. Rather, the weld spots 177 form, after the separation of the rail piece 3, attachment points associated with the ends of the measuring tape for the rest of the measuring tape 129 remaining on the shortened rail strand 103, or for the part of the measuring tape 129 which belongs to the separated rail strand. Both in the case of the cut off rail piece 3 and in the case of the shortened rail strand 103, the respective pertinent section of the measuring tape 129 continues to be under elastic stretch pretension. After the rail piece 3 had been cut off, one can achieve a complete sealing of the respective measuring-tape section at the weld spots 177 by means of crosswise welding, similarly to what was done in the case of the crosswise weld seams 171 as shown in FIG. 5.

When the measuring tape 129 is applied to the rail strand 103 under elastic stretching, the measuring markings, e.g., the slits 37 and the reference slits 41, as shown in FIG. 3, may already be present on the measuring tape 129. However, it is alternatively possible to incorporate the measuring markings into the measuring tape 129 after the measuring tape 129 had been attached to the rail strand 103.

If the measuring tape 129 is to be provided with the measuring markings before attachment to the rail strand 103, it is conceivable to clamp the measuring tape 129, in an elastically stretched condition, in an appropriate clamping device, and to form the measuring markings on the measuring tape 129 with the desired specified graduation which they are to possess in the final assembly condition. Alternatively, one can form the measuring markings on the unstretched measuring tape. In that case, one applies on the measuring tape the measuring markings with a so-called minus graduation. By minus graduation is meant that the measuring markings are deliberately applied on the measuring tape at distances from each other that are smaller than a desired specified graduation in the final assembly condition, i.e., in the stretched condition, of the measuring tape.

If the latter approach is selected, one can in particular select a minus graduation which is so large that, even allowing for manufacturing tolerances which as a rule are unavoidable when applying measuring markings, an additional stretching of the measuring tape will still be required in order to obtain the desired correct dimension of the graduation. Even though there are available processes for applying to the measuring tape measuring markings of comparatively high precision, it is still possible that distance tolerances between the measuring markings may occur. Looking at just a few consecutive measuring markings, it is quite conceivable that these distance tolerances belong to a non-critical order of magnitude. However, seen from the viewpoint of a measuring tape that is several meters long and is provided over its entire length with many thousands of measuring markings, there can occur, under a worst-case scenario, an aggregation of all distance tolerances between two respectively consecutive measuring markings. This may have the consequence that, whereas a first measuring marking might be arranged at the essentially precise desired point on the measuring tape, a final measuring marking arranged on the measuring tape at a distance of several meters might be shifted by such a distance, compared to the desired specified position, that it suffices to lead to considerable measuring errors during the measuring operation. On the other hand, if in contrast, the measuring markings are deliberately applied to the measuring tape with minus graduation, and this minus graduation is subsequently compensated by the elastic stretching of the measuring tape, the final product may achieve a very high level of precision by means of the scale represented by the measuring markings. In order to provide a numerical example: the slits 37 according to FIG. 3 could be applied to the unstretched measuring tape with a graduation distance of 0.999 mm instead of the desired graduation distance of 1 mm. Accordingly, the graduation distance was deliberately selected to be 1 $\mu$m. It was found that in that case a stretching in the range of 70–100 $\mu$m was often sufficient to obtain on average between the pairs of consecutive slits the desired graduation distance of 1 mm and, over and above that, to achieve the result that the first slit on the measuring tape was located at essentially exactly the desired specified distance from the last slit on the measuring tape.

One can predetermine, in the form of a defined stretch amount, by how much the measuring tape must be stretched when it is applied to the rail strand, such stretch amount being established empirically. It is also conceivable that one can predetermine values for the force with which the measuring tape must be drawn in order to stretch it. However, it is preferable to stretch the measuring tape by an amount which depends on the individual case. This can be achieved in a manner such that the stretching of the measuring tape is carried out on a measuring bench which features a calibrated reference measuring system, with which one can compare the measurements produced on the measuring tape to be stretched and applied to the rail strand. The rail strand can be clamped onto this measuring bench. The measuring tape which, in accordance with FIG. 4, is attached at one end to the rail strand, is gripped at its other, free tape end by a stretching device of the measuring bench, and is first tensioned "to the touch," so that it is taut but has not as yet been stretched into the elastic range.

The reference measuring-system comprises a calibrated reference scale and a reference measuring head which can travel over the reference scale. A second measuring head is combined with the reference measuring head, the second measuring head traveling over the measuring tape that is to be mounted on the rail strand. The reference measuring head travels a predetermined distance along the rail strand. The reference measuring system provides a value for the distance covered which is equivalent to the actual length of the distance. At the same time, the second measuring head scans the measuring markings of the measuring tape held against the rail strand. The pulses caused thereby are counted. The Actual Count Value so determined is compared with a Specified Count Value, the latter being the one that would have to be obtained if the measuring markings already had the correct graduation distance. The Specified Count Value is found from the path distance of the path covered by the reference measuring head and from the desired correct measure of the graduation distance of the measuring markings of the measuring tape to be applied to the rail strand.

If the measuring tape is unstretched at the beginning and its measuring markings were applied with minus graduation, the Actual Count Value as determined will be greater than the Specified Count Value. Because of the insufficient graduation distance of the measuring markings, there are contained, on the path covered by the reference measuring head, more measuring markings than if the measuring markings had embodied the Specified Graduation Distance. By repeatedly stretching the measuring tape by a specific length and by immediately testing the result of such a stretching, using the reference measuring system, one can approximate, in an iterative manner of proceeding, the Specified Condition for the measuring tape.

The precision of the measuring tape obtained in this fashion is maintained if, at a later time, individual rail pieces are cut from the rail strand. This is so because, earlier, the measuring tape had been attached to the rail strand on both sides of the cut-off points. In order to prepare a multiplicity of rail pieces of which each carries a measuring tape applied with great precision, it is therefore sufficient to carry out the abovementioned stretching and measuring procedure a single time on the unshortened rail strand. This considerably decreases expense in time and procedure.

According to the abovementioned stretching and measuring procedure, the measuring tape may even be attached to the rail strand, or, more generally, to the carrier, continuously along its entire length.

In order to form the slits 37, 41 in the measuring tape 29 according to FIG. 3, it is preferable to resort to a photolacquer technique. In that case, one unwinds, for example, a continuous metal tape about 0.3 m thick from a supply roll and transports it, if desired after running it through a straightening or evening station, to a photo-processing station. In this photo-processing station, one treats at each time only one comparatively short section of the metal tape, for the purpose of forming slits. Such a section may be about, for example, 10 cm long. The metal tape is then transported pushwise through the photo-processing station and, if the case, through other preceding or following stations. For the further transportation, braking and tensioning of the metal tape, one can provide appropriate gripping and braking mechanisms of the type of mechanism known in the field of tape-type material processing.

In the photo-processing station, the section of the metal tape to be treated is thoroughly cleaned and dried, after which a layer of photo lacquer is applied and then exposed through a photo mask. The photo mask contains a slit pattern that corresponds to the pattern of slits 37, 41 according to FIG. 3. After appropriate interprocessing of the exposed photo lacquer, in particular, a developing process, there remains, on the section of the metal tape in treatment, a lacquer pattern which contains free spots where the slits 37, 41 are to be created. Next, the section of metal tape under treatment is plunged into an etching bath whose etching solution etches the slits 37, 41 into the material of the metal tape, at the places devoid of lacquer. After the metal tape has run through the etching bath, it is again thoroughly cleaned and conveyed to further processing. The metal tape equipped with the slits 37, 41 can be, for example, wound again onto a supply roll.

In the case of the measuring tape 29 shown in FIG. 3, the reference slits 41 are incorporated into the measuring tape 29 as a track parallel to the slits 37. Particularly in the case of very small guide rails, it may occur that the measuring tape is not sufficiently wide to accommodate the application of the reference slits 41 at a sufficient distance from the slits 37. Should the slits 37 and the reference slits 41 lie too close to each other, as seen in the widthwise direction of the measuring tape, the sensor signals derived from the slits 37 could overlap with those derived from the reference slits 41, in which case the evaluation circuit 35 might not be able to decide whether an individual pulse was caused by passing a slit 37 or by passing a reference slit 41. This can impair the functionality of the position-measuring arrangement. For those cases in which there is insufficient space available on the measuring tape for the parallel adjacent accommodation of two or more tracks of slits, the variant in FIG. 7 is indicated.

Figure 7:
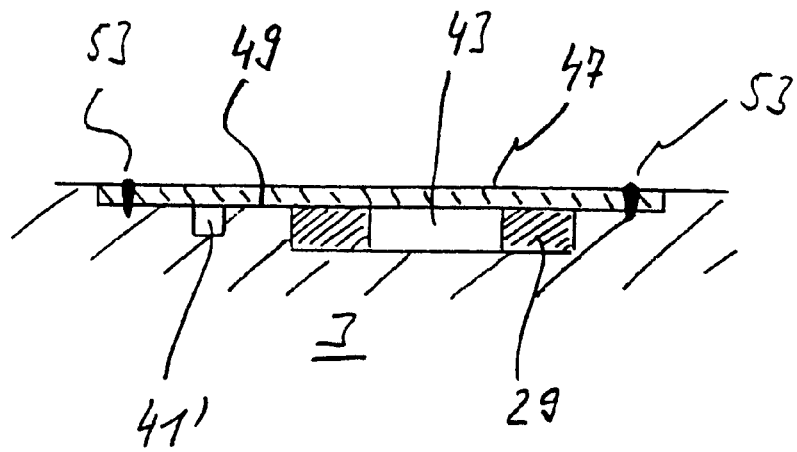
FIG. 7 is a variant of FIG. 2.

In FIG. 7, like reference numbers increased by 200 have been used to identify like parts in FIG. 2. As shown at the left hand side of FIG. 7, one of the support steps 249 of the longitudinal groove 243 is widened. This widening leaves room for reference bores 241' to drill directly into the guide rail 203. The reference bores 241' cause oscillations in the flux density of the magnetic field irradiated by the sensors in a manner similar to that of slits 237, 241. With that, the bores 241' can be detected just as well as slits 237, 241. The reference bores 241', which can be drilled, for example, with a diameter of 0.6 mm, replace the reference slits 241. In such case, the measuring tape 229 only carries the slits 237 and can thus be kept appropriately narrow. Inasmuch as the reference bores 241' are covered by cover tape 247, they are protected against contamination and damage.

Occasionally, it is desired to avoid the existence of an interstice between the measuring tape and the cover tape, that is, the cover tape is to lie on the measuring tape but without a rigid connection between the two. In that case, the following problem can occur. During welding, the cover tape is to be pressed into the longitudinal groove of the guide rail in order to prevent the occurrence of welding faults. For that purpose, the welding device used can feature a down-presser which travels with a small lead in front of the actual welding spot. It was found that this down-presser can have a deleterious effect on the measuring tape, to the extent to which the down-pressing of the cover tape can also exert a mechanical pressure on the measuring tape that lies, without an interstice, under the cover tape. Such a pressure can lead to deformations of the measuring tape which don't always disappear. Finally, there also exists the danger that the down-pressing of the cover tape may cause losses of accuracy in the measuring tape.

Figure 8:
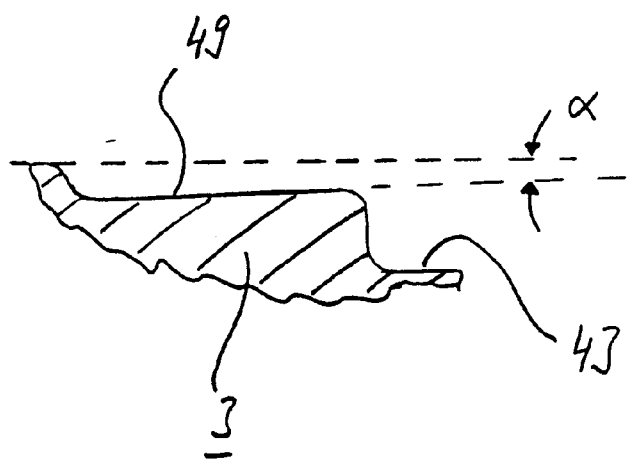
FIG. 8 is a detail view of the guide rail in the region of a support step for the cover tape.

This problem can be avoided by slightly chamfering the support steps 49 of the longitudinal groove 43. This is shown in FIG. 8, where like parts are identified by like numbers increased by 300. It can be seen there that the supporting surface formed by support step 349 has a slight slope towards the outer side of the groove, e.g., an angle α of about 2°. If the cover tape is pressed against such a chamfered support step, it gains a slight crown which causes it to lift somewhat from the measuring tape underneath it. The measuring tape is thus protected against the effect of mechanical pressures. The problem of deformations as mentioned above will then no longer occur.

Although the invention has been described herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

What is claimed is:

1. A process for the production of an arrangement for the determination of the relative position of two bodies that are movable in relation to each other, wherein a first of the two bodies carries measuring markings that are distributed over a marking range and the second of the two bodies carries a sensor arrangement which responds to the measuring markings and travels over the marking range in the course of relative movement between the two bodies, said process comprising:

covering the measuring markings by a cover tape which is separate from the first body; and attaching the cover tape to the first body along each of the longitudinal edges of the cover tape by at least one longitudinal welding seam adjacent to the respective longitudinal edges of the cover tape, said two longitudinal welding seams being applied essentially simultaneously.

2. A process according to claim 1, wherein said longitudinal welding seams are applied in the same welding direction.

3. A process according to claim 2, wherein the longitudinal welding seams are applied jointly, starting from one lengthwise end of the cover tape.

* * * * *

UNITED STATES PATENT AND TRADEMARK OFFICE
CERTIFICATE OF CORRECTION

PATENT NO.     : 6,564,468 B2
DATED          : May 20, 2003
INVENTOR(S)    : Blattner et al.

It is certified that error appears in the above-identified patent and that said Letters Patent is hereby corrected as shown below:

<u>Title page,</u>
Insert -- [30]   Foreign Application Priority Data
          May 14, 1999 (DE) … 199 22 363.7 --

<u>Column 2,</u>
Line 7, "longitudinally-opposite" should read -- longitudinally opposite --
Lines 63 and 66, "permitivity" should read -- permittivity --

<u>Column 4,</u>
Line 15, "longitudinally-opposite" should read -- longitudinally opposite --

<u>Column 8,</u>
Line 59, "edges-of" should read -- edges of --

<u>Column 9,</u>
Line 10, "essentially—" should read -- essentially --
Line 11, "simultaneously—applied" should read -- simultaneously applied --

<u>Column 12,</u>
Line 7, "31'moving" should read -- 31—moving --

Signed and Sealed this

Twenty-first Day of October, 2003

JAMES E. ROGAN
*Director of the United States Patent and Trademark Office*